Oct. 6, 1931.  J. CASSELMAN  1,825,852
TRANSMISSION MECHANISM
Filed Oct. 7, 1929  2 Sheets-Sheet 1
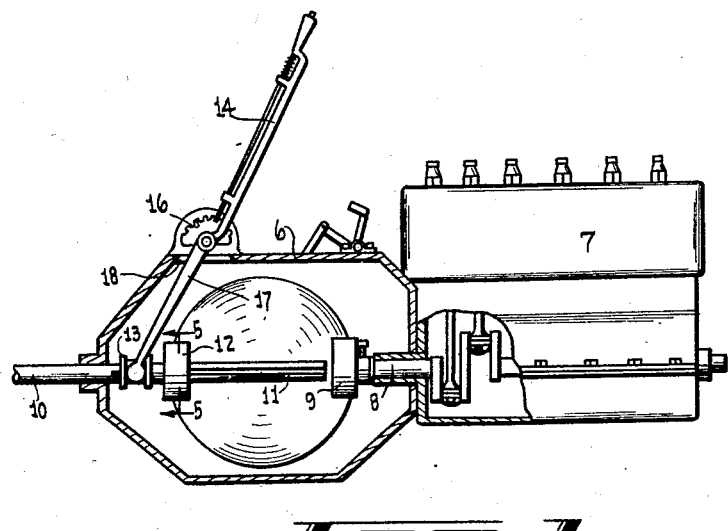
Fig. 1
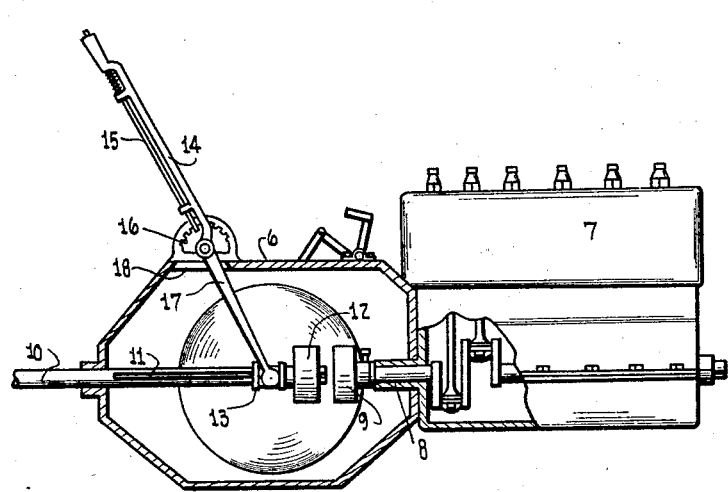
Fig. 2
INVENTOR
JAMES CASSELMAN.
HIS ATTORNEY.

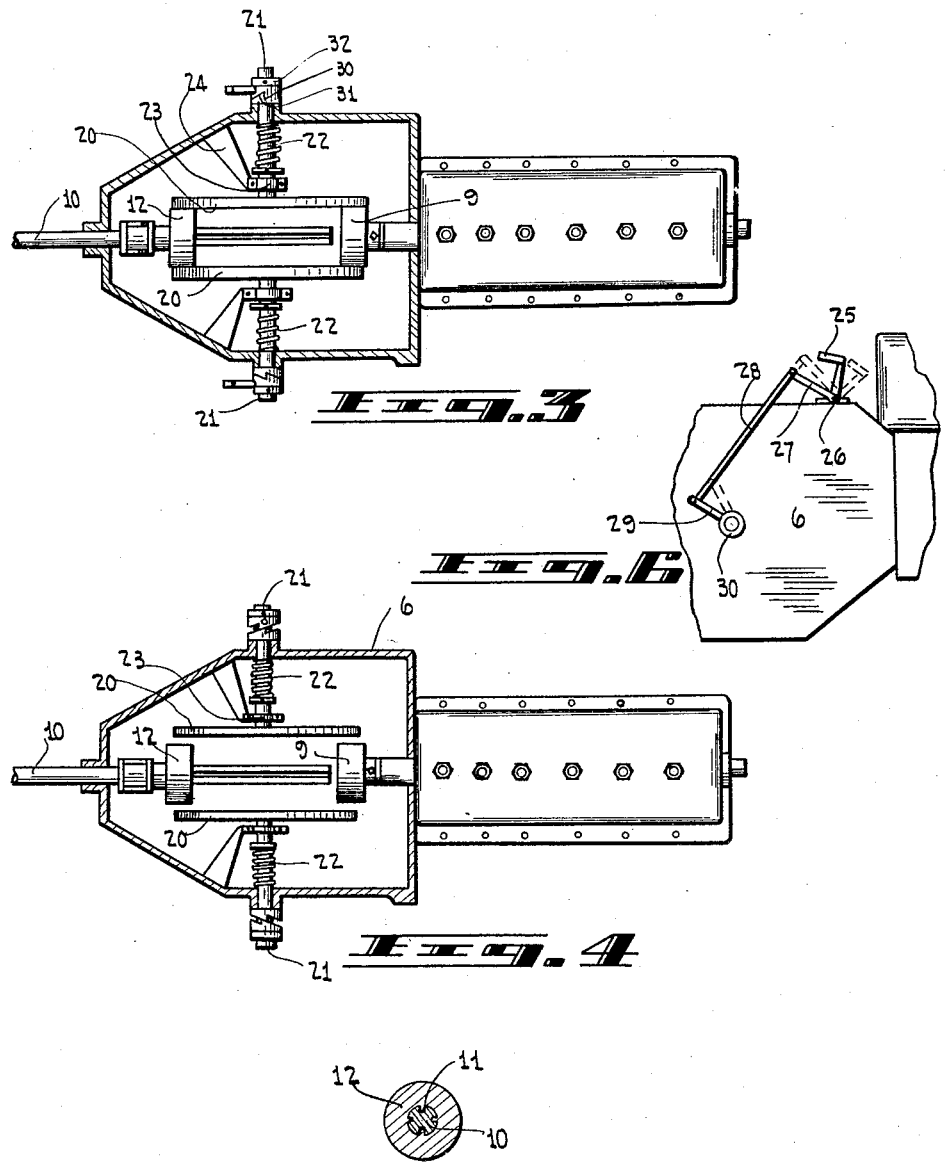

Patented Oct. 6, 1931

1,825,852

UNITED STATES PATENT OFFICE

JAMES CASSELMAN, OF HARTSMERE, ONTARIO, CANADA

TRANSMISSION MECHANISM

Application filed October 7, 1929, Serial No. 397,871, and in Canada October 8, 1928.

This present invention relates to improvements in transmission mechanism appertaining particularly to a variable friction transmission adapted for use in automobiles, motor boats, other vehicles, stationary engines and similar power plants where it is desirable to obtain varying strength and speed from a power unit.

An object is to provide a built-in or encased friction transmission set coupling the power unit and drive shaft so that the power unit and drive shaft may be readily disconnected entirely at any time or coupled in any desired speed relation from the maximum rotation in one direction to the maximum rotation in the reverse.

A further object is to provide a variable speed friction transmission wherein the coupling between the power unit and drive shaft is variable gradually all the way from maximum speed rotation in one direction to the maximum reverse by simple operation of a hand lever.

A further object of the invention is to provide a friction transmission wherein the actual coupling of the power unit and drive shaft is controlled by a releasing foot pedal and the varying adjustment of the said power unit and drive shaft is accomplished by the operation of a hand lever.

A still further object of the invention is the provision of a transmission mechanism as described that is characterized by structural simplicity, the elimination of extraneous and unnecessary parts, ease of operation, direct action, durability, and low cost of production, being thereby rendered commercially desirable.

To the accomplishment of these and related objects, as will become apparent as the description proceeds, my invention resides in the construction, combination and arrangement of parts as shall be hereinafter more fully described, illustrated in the accompanying drawings and pointed out in the claim hereunto appended.

The invention will be best understood and can be more clearly described when reference is had to the drawings forming a part of this invention wherein like characters indicate like parts throughout the several views.

In the drawings:—

Figure 1 is a fragmentary sectional side elevation of a conventional power plant with my improved transmission mechanism associated therewith;

Figure 2 is a similar side view showing the variable speed elements of the transmission mechanism in an altered position;

Figure 3 is a fragmentary sectional plan of the same assembly;

Figure 4 is a similar plan view showing the direct coupling parts of the transmission mechanism in changed relation;

Figure 5 is a transverse section of the splined end of the drive shaft;

Figure 6 is a fragmentary detail elevation, showing the friction disk releasing mechanism.

In many ways mechanical transmission by the use of gearing is deficient, chief among which is its inability to provide the desired minute variable adjustment between power unit and drive when limited to a given number of selective ratios.

In my improved transmission, all the advantages of a variable adjustable friction coupling are incorporated and the number of working, wearing and adjusting parts are remarkably few and their construction, assembly and operation simple.

This friction transmission mechanism is here shown, except for the controls, encased in the housing 6 built into or against the back end of the power unit or motor 7, the crank shaft 8 of which continues into the forward end of the housing and terminally carries a friction wheel 9 keyed or otherwise fastened tightly thereto.

The drive shaft 10 which enters the housing from the opposite end is obviously aligned with the crank shaft 8 and extends forwardly into close proximity to the wheel 9 carried on the rear end of the latter shaft. The forward end of the drive shaft 10 is splined as at 11 to receive the second friction wheel 12 which carries, to its rear, a double flanged collar 13. As this friction wheel 12 is adapted to slide freely longitudinally on the splined end of the shaft 10 an operating means is shown comprising a hand lever 14 pivoted on the casing 6 and controlled by the action of a thumb depressed spring urged catch 15 in a toothed segment 16 while the lower end 17 of the lever 14 continues through a slot 18 in the housing top and is forked or bifurcated to straddle the collar 13 and work between the spaced pair of flanges thereof.

A pair of coupling disks 20 are carried on the respective inner ends of aligned transverse shafts 21 journalled in the opposite sides of the housing 6 so that said disks are in planes at right angles to the friction wheels 9 and 12, parallel with each other and their spaced confronting faces on opposite sides of the said friction wheels, into engagement with which said disks are normally urged by the coil springs 22 surrounding the shafts 21 and compressed between the inner sides of the housing walls and the bearing collars 23 carried on the supporting brackets 24 projecting inwardly at an angle from opposite side walls of the housing 6.

A foot pedal 25, for releasing the disks 20 from engagement with the friction drive wheels 9 and 12 and thereby disconnecting the power unit and drive, rises to a convenient position from one side of the housing 6 pivoting on and with the transverse rod 26 to which it is rigidly fastened. This rod 26 extends transversely across the top of the housing 6 from side to side thereof. From the crank ends 27 of the rod 26 depend a pair of rods 28 on either side of the casing 6 so as to also pivotally connect with the short arms 29 extended radially from the sleeves 30, which are rotatably mounted on the outer end portions of the shafts 21 between the bearings 31 rigid with the housing 6 and the stop collars 32 secured to the shafts 21 adjacent the outer extremities thereof. The opposed faces of the bearings 31 (which surround the shafts 21) and the sleeves 30 are bevelled or cam shaped and opposed so that upon rotation of the sleeve 30 in one direction, on the depression or forward movement of the foot pedal 25, the shaft 26 rotates to spread or disconnect the disks 20 by the action of the rods 28, operating the fingers 29 of the sleeves 30. On this outward movement of the shafts 21, the springs 22 are compressed thus assuring action of the springs 22 to return the shafts 21 and the rods 28 as well as the fingers 29, sleeves 30 and the foot pedal 25 to normal or unoperated position and the disks 20 into engagement with the friction wheels 9 and 12 when the foot pedal 25 is again released, pivoting on upstanding pintles 28 carried inwardly from the front wall of the housing about level with the shafts 8, 10 and 21, have their respective inturned arms engaging the depending fingers 26 and their rearwardly directed arms forked to straddle and work in the disk collars 23 and between the spaced flanges thereof so that on the depression or forward movement of the foot pedal 24 the shaft 25 rotates to spread or disconnect the disks 20 by the action of the cam fingers 26 on the controlling bell cranks 27.

On account of the preceding detailed description of the invention, its construction and assembly should be clearly understood so that it will suffice in conclusion to make but brief reference to its use and modus operandi: When the motor 7 is running, the same may be allowed to "idle" disconnected from the drive shaft 10 by depressing the foot pedal 25 thus spreading the disks 20 out of contact with the friction drive wheels 9 and 12. The releasing of the pedal 24 brings the disks 20 into operation and the shaft 10 is rotated at the desired speed and in any chosen ratio with the motor by the simple manipulation of the hand lever 14, that can gradually increase the rotation of the drive shaft 10 in either direction from a standstill to its maximum speed.

From the foregoing description taken in connection with the accompanying drawings, it will be manifest that a transmission mechanism is provided that will fulfil all the necessary requirements of such a device, but as many changes could be made in the above description and many apparently widely different embodiments of my invention may be constructed within the scope of the appended claim, without departing from the spirit or scope thereof, it is intended that all matters contained in the said accompanying specification and drawings shall be interpreted as illustrative and not in a limited sense.

Having thus described my invention what I claim as new and desire to secure by Letters Patent is:

A variable friction transmission mechanism comprising the combination with the crank shaft of a power unit and an aligned drive shaft; of a friction wheel fixed on an end of said crank shaft; a second friction wheel rotatable with and longitudinally slidable on said aligned drive shaft; a housing for encasing said mechanism; means for moving said second friction wheel longitudinally on its shaft; a pair of opposed friction disks parallel with each other and in planes at right angles to said friction wheels and mounted on the inner ends of respective aligned stub shafts journalled in opposite sides of said housing; coil springs compressed between the housing and said friction disks for normally holding said disks in engagement with the peripheries of said friction wheels; a transverse rod extending across said housing from side to side and above the same; a pair of depending rods on opposite sides of said housing; radial arms carried by said transverse rod and pivoted to the upper ends of said depending rods, one on either side of the housing so as to straddle the same; a foot pedal fastened exteriorly to said transverse rod at one side of said housing; stationary bearings on said housing surrounding said stub shafts and having outer cam faces; collars rigid with said stub shafts and spaced from said last mentioned bearings; sleeves working on said stub shafts between said last mentioned bearings and said collars; and radial arms carried by said sleeves and pivoted to the lower ends of said depending rods; said sleeves having cam faces opposed to and riding on the said cam faces of said last mentioned bearings to move said stub shafts outwardly and thus disengage said friction disks from said friction wheels.

In testimony whereof I hereunto affix my signature.

JAMES CASSELMAN. [L. S.]